United States Patent
Kraus et al.

(10) Patent No.: US 12,460,814 B2
(45) Date of Patent: Nov. 4, 2025

(54) LOW NOX GAS BURNER WITH COOLED FLUE GAS RECYCLE

(71) Applicant: Honeywell International Inc., Charlotte, NC (US)

(72) Inventors: Kurt E. Kraus, Tulsa, OK (US); Dusty Ray Richmond, Cleveland, OK (US); Mohammad Reza Mostofi-Ashtiani, Naperville, IL (US); Zhili Qin, Tulsa, OK (US)

(73) Assignee: Honeywell International Inc., Charlotte, NC (US)

( * ) Notice: Subject to any disclaimer, the term of this patent is extended or adjusted under 35 U.S.C. 154(b) by 379 days.

(21) Appl. No.: 18/062,768

(22) Filed: Dec. 7, 2022

(65) Prior Publication Data

US 2023/0213182 A1 Jul. 6, 2023

Related U.S. Application Data

(60) Provisional application No. 63/266,306, filed on Dec. 31, 2021.

(51) Int. Cl.
| | |
|---|---|
| *F23C 9/08* | (2006.01) |
| *F23C 1/08* | (2006.01) |
| *F23C 6/04* | (2006.01) |
| *F23C 9/00* | (2006.01) |
| *F23L 3/00* | (2006.01) |
| *F23L 15/04* | (2006.01) |

(52) U.S. Cl.
CPC .................. *F23C 9/08* (2013.01); *F23C 1/08* (2013.01); *F23C 6/047* (2013.01); *F23C 9/006* (2013.01); *F23L 3/00* (2013.01); *F23L 15/04* (2013.01); *F23C 2203/30* (2013.01); *F23D 2208/10* (2013.01)

(58) Field of Classification Search
CPC .... F23C 9/006; F23C 9/06; F23C 9/00; F23C 9/08; F23C 6/047; F23C 1/08; F23L 15/04; F23L 3/00
USPC ................................................ 431/9, 115–116
See application file for complete search history.

(56) References Cited

U.S. PATENT DOCUMENTS

| | | | | |
|---|---|---|---|---|
| 3,604,824 | A | * | 9/1971 | Hardison ................ F23G 7/066 34/633 |
| 4,995,807 | A | | 2/1991 | Rampley et al. |
| 5,044,932 | A | | 9/1991 | Martin et al. |

(Continued)

FOREIGN PATENT DOCUMENTS

| | | |
|---|---|---|
| CN | 210740397 U | 6/2020 |
| CN | 212298953 U | 1/2021 |

(Continued)

OTHER PUBLICATIONS

International Search Report from Corresponding PCT application No. PCT/US2022/082448, mailed Apr. 28, 2023.

(Continued)

*Primary Examiner* — Vivek K Shirsat

(57) ABSTRACT

A burner and methods of using the burner. The burner produces a flame from combustion air and fuel gas. Flue gas, also produced, can be withdrawn and recycled to the burner. A cooling or condition gas, such as ambient air, may be mixed with the flue gas to reduce its temperature. The burner may also utilize a stage injection so that a portion of the produced flue gas is recycled internally.

18 Claims, 9 Drawing Sheets

(56) References Cited

U.S. PATENT DOCUMENTS

| | | | |
|---|---|---|---|
| 5,147,200 A | 9/1992 | Knöpfel et al. | |
| 5,275,554 A | 1/1994 | Faulkner | |
| 5,284,438 A | 2/1994 | McGill et al. | |
| 6,558,153 B2* | 5/2003 | Schutz | F23C 9/08 |
| | | | 431/115 |
| 2002/0197574 A1 | 12/2002 | Jones et al. | |
| 2008/0014537 A1 | 1/2008 | Atreya | |
| 2008/0206693 A1 | 8/2008 | Lifshits et al. | |
| 2014/0272736 A1* | 9/2014 | Robertson | F23C 6/02 |
| | | | 431/174 |
| 2022/0146202 A1 | 5/2022 | Francis et al. | |
| 2023/0288059 A1* | 9/2023 | Dzubiella | F23N 5/003 |

FOREIGN PATENT DOCUMENTS

| | | |
|---|---|---|
| CN | 113841021 A | 12/2021 |
| KR | 20170138042 A | 12/2017 |
| KR | 101992413 B1 | 6/2019 |

OTHER PUBLICATIONS

Written Opinion from Corresponding PCT application No. PCT/US2022/082448, completed Apr. 27, 2023.
International Search Report and Written Opinion from PCT application No. PCT/US2022/082547, mailed May 9, 2023.
Extended European Search Report from corresponding application No. 22917522.9 dated Aug. 11, 2025.

* cited by examiner

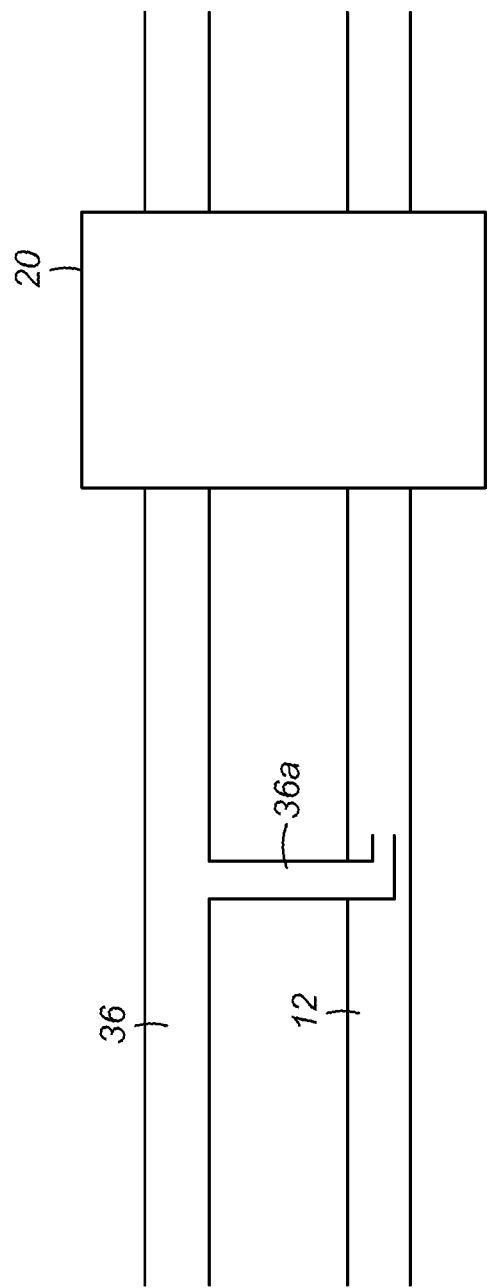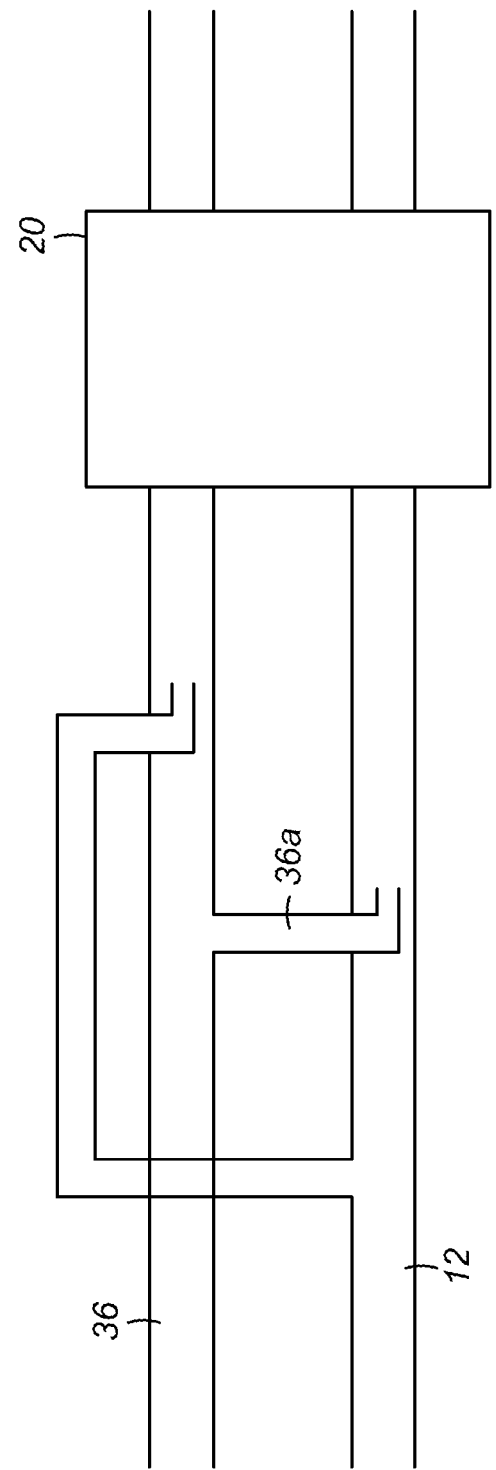

LOW NOX GAS BURNER WITH COOLED FLUE GAS RECYCLE

RELATED APPLICATIONS

This application claims priority to U.S. Provisional Patent Application Ser. No. 63/266,306, filed on Dec. 31, 2021, the entirety of which is incorporated herein by reference.

FIELD OF THE INVENTION

This invention relates generally to a gas burner having a lower NOx production, and more particularly to a burner that uses a cooled or conditioned recycled flue gas.

BACKGROUND OF THE INVENTION

Petroleum refining and petrochemical processes frequently involve heating process streams in a furnace. The interior chamber of the furnace contains tubes which contain the process streams. The interior chamber is heated by a plurality of gas burners which receive a fuel which combusts to produce heat.

One area of concern for gas burners is the production of NOx gases. As would be appreciated, NOx refers to oxides of nitrogen, principally comprised of nitric oxide, NO, and nitric dioxide, $NO_2$. It is believed that there are at least three principal NOx formation mechanisms in combustion processes: Thermal NOx, Fuel NOx, and Prompt NOx. See, "Nitrogen Oxides (NOx), What and How They are Controlled," EPA Technical Bulletin November 1999 (available at: https://www3.epa.gov/ttncatc1/dir1/fnoxdoc.pdf).

It is known that NOx formation in gas burners can be mitigated by staging fuel and air and creating primary and secondary combustion (flame) zones. Staged air and staged fuel burners work primarily on the Thermal NOx and Prompt NOx formation processes. The highest flame temperatures, and thereby the greatest potential for Thermal NOx formation, is achieved when gaseous fuels and combustion air are thoroughly mixed and rapidly combusted in or near stoichiometric proportions.

In addition to lowering NOx production by staging the mixture of fuel and combustion air, staged burners utilize flue gas recirculation to reduce NOx formation. More specially, this internal flue gas recirculation is a result of flue gas in the combustion zone being drawn up with the staged gases being injected by the burner. This flue gas, relatively cool, massive products of combustion (flue gas), pass into and through the combustion zones thereby further cooling the combustion zone and reducing Thermal NOx formation. The water vapor in the flue gas also serves to mitigate NOx created via the Prompt NOx mechanism by solvating and catalyzing hydrocarbon combustion by more recently understood Water Gas Shift Reaction ("WGSR") mechanisms described in "A Paradigm Shift in Steam Assisted Elevated Flare Systems," International Flame Research Foundation, July 2020, by Jan De Ren, Kurt Kraus and Chris Ferguson. These WGSR mechanisms are also present to a limited degree in classic or conventional staged fuel or staged air burners as products of combustion from the primary combustion zone to the secondary combustion zone includes some water vapor. However, as this recirculation occurs entirely within the combustion zone, it is difficult to control and fully utilize the ability of the flue gas to reduce NOx formation.

It is also known that flue gas may be extracted from the exhaust of a combustion chamber and reintroduced into the burner air as a way method of reducing oxides of nitrogen created in a burner's flame. This "external" flue gas recirculation acts to reduce the flame temperature and slightly delay the combustion process allowing for additional time for heat to radiate from the flame and thereby reducing the flame temperature and the formation of oxides of nitrogen created via the thermal NOx formation mechanisms. Further, as discussed above the flue gas again water that acts, not only to directly reduce flame temperature, but some of the water disassociates forming hydroxide anions which service to catalyze (reduce the activation temperature) and act as a solvate further reducing flame temperature and thermally driven NOx formation.

However, conventional "external" flue gas extraction and recirculation systems rely on relatively cool flue gas extracted downstream of the radiant and convective heat transfer sections of the combustion system. In systems that extract flue gas from downstream of the convection section, the recycled or recirculated flue gas must pass through the radiant and convection sections at least twice thereby increasing the mass flow rate through these sections and changing their heat transfer properties.

Therefore, there remains a need for a burner that has a low NOx production that does not suffer from these drawbacks.

SUMMARY OF THE INVENTION

A new burner and methods of using same have been invented in which relatively high temperature flue gas (approx. 980 to 1370° C. (1,800 to 2,500° F.)) is cooled to a temperature that will not damage the heat exchangers, ductwork, fans, burner housing and other components when recirculated. Surprisingly, it has been found that by mixing the flue gas, alone or in combination with a cooling gas, which may include an oxygen containing gas like air, the flue gas may be cooled and used to reduce NOx formation—even though additional oxygen may be mixed. The cooled, or conditioned flue gas may be injected in targeted and selective manners as described in U.S. patent application Ser. No. 17/451,933 filed on Oct. 22, 2021. By selectively targeting the flue gas injection, only a minimal amount of flue gas is required. For example, it is believed that less than 30%, to as little as 0.5% of total flue products from the burner(s) is needed to be recirculated and delivered to the burners.

This invention also delivers the flue gas to the burner for targeted injections at temperatures well above the saturation temperature (dew point, >149° C. (300° F.)) of the mixture to avoid condensation. Condensation of water in the flue gas can contain nitric and other acids that can corrode the metal parts.

Moreover, at temperatures less than 982° C. (1,800° F.) and as low as 200° C. (500° F.), this flue gas allows use of lower service temperature and thus lower cost materials for the ducting, heat exchanger and fan. Low grade stainless steel such as 304SS can be used rather than high temperature, high-cost metal alloys such as Hastelloy or Inconel. In some instances, the heat exchanger may not be needed. Further, by extracting the flue gas from the hot combustion chamber into which the burner(s) is mounted, the length of flue gas pipe, material and installation capital costs are minimized.

Finally, since the present burner achieves extremely low NOx emissions while running elevated levels of oxygen in the forced internal (internal to the combustion chamber) recirculated flue gas, allows the burner to achieve low NOx at elevated excess air, when that elevated excess air is delivered through targeted injection, this invention. Additionally, by delivering low NOx at high excess air, the burner is able to deliver constant mass flow rate when transitioning from high flue gas mass flow rate fuels, such as natural gas, to low mass flow rate fuels like hydrogen.

Accordingly, the present invention may be broadly characterized as providing a burner configured to receive a fuel gas and a combustion air which react and produce a flame and a flue gas in a combustion zone, in which the burner has: a duct configured to remove a portion of the flue gas from the combustion zone as a recycled flue gas, wherein the recycled flue gas is mixed, upstream of the combustion zone, with the fuel gas and the combustion air; and, optionally, an inlet configured to provide a cooling gas to the recycled flue gas, wherein the cooling gas is provided to the recycled flue gas upstream of the mixing of the recycled flue gas with the fuel gas and the combustion air.

Additionally, the present invention may also be characterized, generally, as providing a process for reducing production of NOx gases at a burner by: injecting a fuel gas into a combustion zone; injecting a combustion air into the combustion zone, wherein the combustion air and the fuel gas react and produce a flame and a flue gas in the combustion zone; and recovering a portion of the flue gas as a recycled flue gas to be mixed, upstream of the combustion zone, with the fuel gas, the combustion air, or both; and, optionally further, mixing the recycled flue gas with a cooling gas before the recycled flue gas is mixed with the fuel gas, the combustion air, or both.

The present invention may further be generally characterized as also providing a burner configured to receive a fuel gas and a combustion air which react and produce a flame and a flue gas in a combustion zone, the burner having: primary injection ports configured to inject fuel gas into a primary combustion zone; secondary injection ports spaced from the primary combustion zone and configured such that as fuel gas is injected a first portion of the flue gas is drawn to the primary combustion zone; and a duct configured to remove a second portion of the flue gas from the combustion zone and return the second portion of the flue gas to the primary combustion zone; and, optionally, further comprising an inlet configured to provide a cooling gas to the second portion of the flue gas in the duct.

Moreover, the present invention may also be broadly characterized as providing a heating system having: a burner configured to receive a fuel gas and a combustion air which react and produce a flame and a flue gas in a combustion zone; a duct configured to remove a first portion of the flue gas from the combustion zone as a recycled flue gas, wherein the first portion of the flue gas is mixed, upstream of the combustion zone, with the fuel gas and the combustion air; and a second duct configured to remove a second portion of the flue gas from the heating system, wherein the second portion of the flue gas has passed through a convection zone of the heating system, wherein the convection section is disposed downstream from the combustion zone, and wherein the second portion of the flue gas is mixed, upstream of the combustion zone, with the fuel gas and the combustion air.

Finally, the present invention may be further characterized generally as providing a method of controlling a burner by: reacting, in a combustion zone of a heating system, a fuel gas and a combustion air to produce a flame and a flue gas; removing a first portion of the flue gas from the combustion zone as a recycled flue gas; mixing the first portion of the flue gas, upstream of the combustion zone, with the fuel gas and the combustion air; removing a second portion of the flue gas from the heating system, wherein the second portion of the flue gas has passed through a convection zone, wherein the convection zone is downstream of the combustion zone; and, mixing the second portion of the flue gas, upstream of the combustion zone, with the fuel gas and the combustion air.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which:

FIG. 4A is a side, partially cutaway schematic view of a flow scheme according to the present invention;

FIG. 4B is a side, partially cutaway schematic view of another flow scheme according to the present invention;

DETAILED DESCRIPTION OF THE INVENTION

As mentioned above, the present invention provides, inter alia, a new burner. This burner, and method of using same, utilizes cooling or conditioning gas to not only reduce the temperature of the mixture of air and flue gas to protect the ducting, heat exchanger and fan from excessive temperatures, but also to introduce a prescribed amount of the combustion air required in the targeted area of the burner. The targeted areas of the burner are more fully described in U.S. patent application Ser. No. 17/451,933 filed on Oct. 22, 2021 (the entirety of which is incorporated herein by reference). For example, if the conditioned flue gas is injected within the burner to mix with the primary fuel and air at the primary fuel and air mixing locations, the conditioned flue gas may supply between 1% to over 200% of the combustion air required for primary combustion zone. The exact proportion or amount of the combustion air supplied by the conditioned flue gas is determined by that amount to bring the mix temperature of the conditioned flue gas to safe levels so not to damage the ducting, instruments, fan or heat exchanger and simultaneously achieve the lowest NOx emissions overall from the burner as measured at the stack. The lowest NOx emissions are achieved with the proper proportion of combustion air, at the reasonably lowest temperature, less than about 260° C. (500° F.) are delivered to the proper targeted location of the burner, say the primary mixing zone or the bypass mixing zone. The optimal combustion air flow as a proportion of the targeted zone combustion may change with changing fuel gas composition. Furthermore, if the flue gas is cool enough, it is contemplated that no additional cooling is needed and therefore, the flue gas may not be mixed with any cooling gas.

Since the combustion chamber on many natural draft and forced draft process heaters and furnaces operate at a pressure slightly less than atmospheric, the conditioning air stream can be drawn in by natural draft, or it can be forced in with a fan if the combustor pressure is greater than atmospheric, as is the case will many boilers. Injecting the air at the floor of the furnace, the cooler, denser air pools at the bottom of the heater and drains out into conditioned flue gas duct with the flue gas drawn in by the flue gas recirculation (FGR) fan.

In this way the burner produces very low NOx emissions with minimal external ducting to each burner (or group of burners) and does not pass additional mass, flue gas through the convection sections thus allowing conventional convection section design.

With these general principles in mind, one or more embodiments of the present invention will be described with the understanding that the following description is not intended to be limiting.

Figure 1:
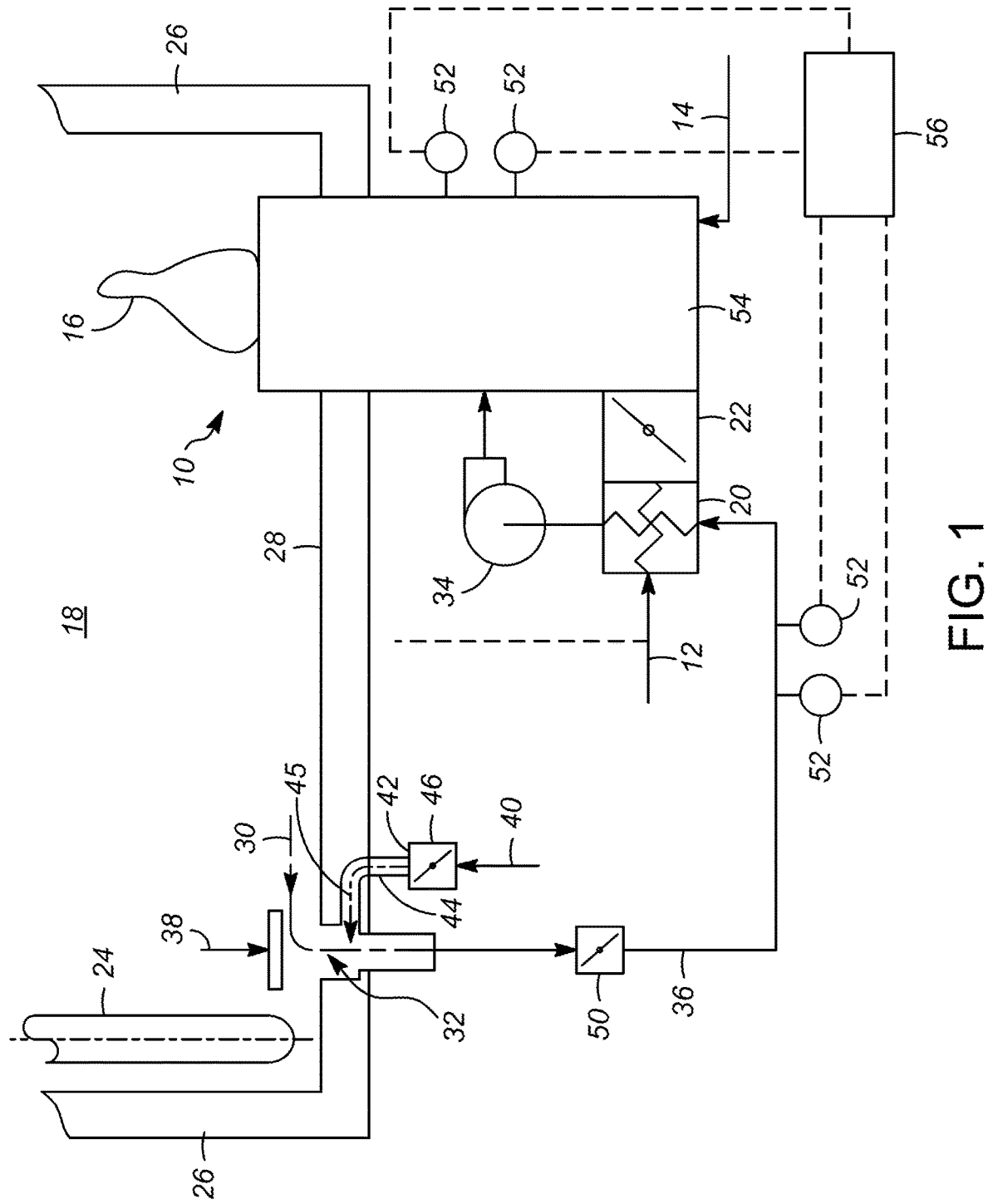
FIG. 1 is a side, partially cutaway schematic view of a combustion zone with a burner according to the present invention.
Figure 2:
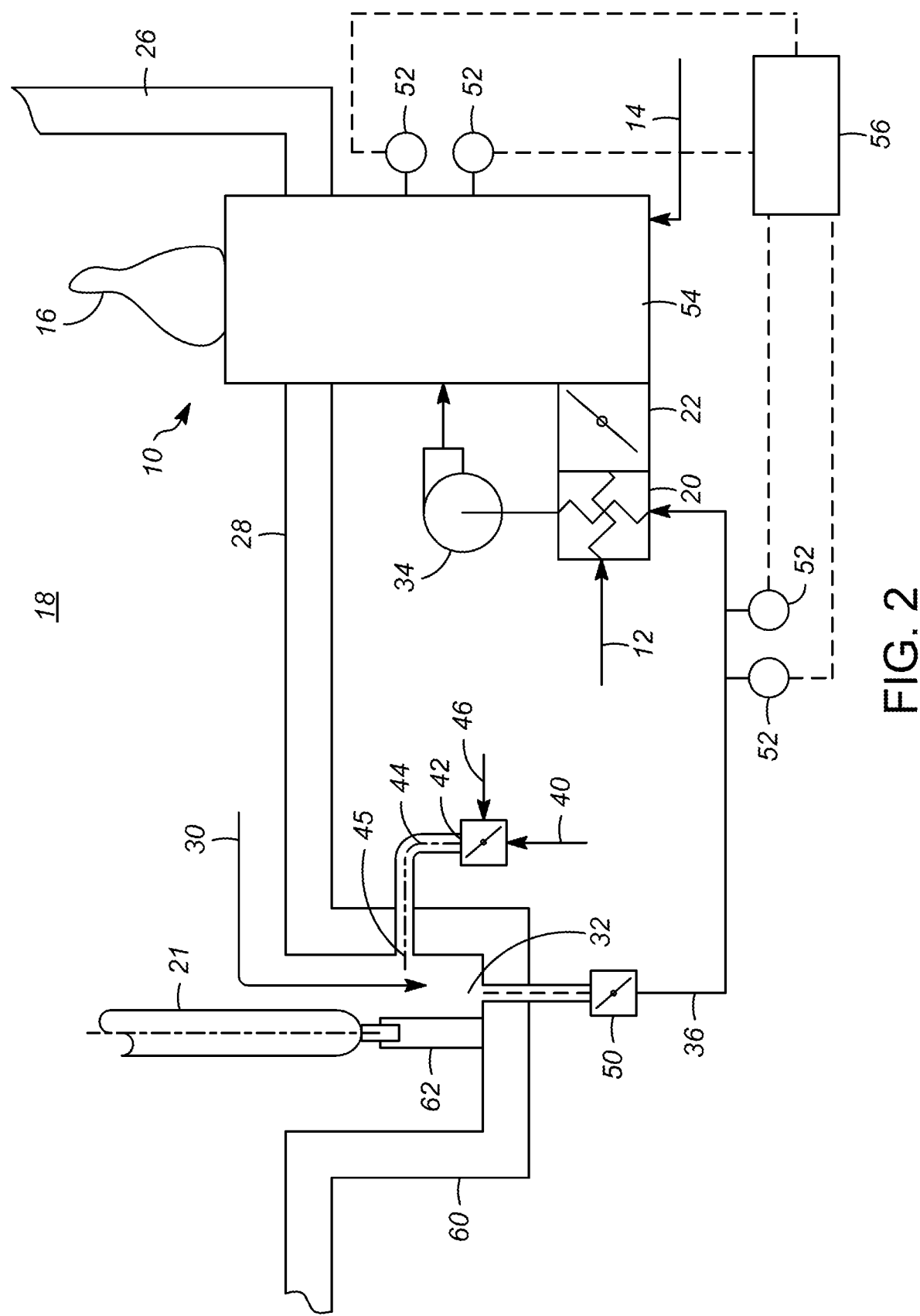
FIG. 2 is a side, partially cutaway schematic view of another combustion zone with a burner according to the present invention.

Turning to FIGS. 1 and 2, the present invention relates to a burner 10. The burner 10 receives combustion air 12 and fuel gas 14. The combustion air 12 and the fuel gas 14 mix and produce a flame 16 in a combustion zone 18. The burner 10 may be either a forced or natural draft burner. The incoming combustion air 12 to the burner 10 may pass through a heat exchanger 20. A burner air inlet register/damper 22 may be utilized to control or adjust the mass or rate of combustion air 12 flow. Again, the combustion air 12 can be either naturally induced from the atmosphere or forced in and either at ambient temperature or preheated.

The heat produced by the flame 16 may be used to heat fluid inside of process tubes 24 within the combustion zone 18. The combustion zone 18 has walls 26 and a floor 28 with a lower portion commonly referred to as a radiant section where the process tubes 24 are heated.

In addition to producing a flame 16, flue gas is produced by the burner 10. Above the radiant section of the combustion zone 18 is a convection section through which the flue gas passes so as to provide additional heat to other process tubes. However, according to the present invention, a portion of the flue gas is withdrawn from the radiant section instead of allowing it to pass to the convection section.

Accordingly, as shown in FIGS. 1 and 2, a flue gas 30 is drawn from the radiant section of the combustion chamber 18 through an aperture 32 or breach in the floor 28. Although not depicted as such, the aperture 32 for the flue gas 30 could be in the wall 26 of the combustion chamber 18.

A fan 34 may be used to pull flue gas 30 from the combustion chamber 18 into duct 36 as a recycled flue gas. The duct 36 may be internally or externally thermally insulated. A radiant heat shield 38, potentially made of high temperature refractory material, may be provided to protect the duct 36 beyond the furnace wall 26 or floor 28.

The flue gas 30 pulled into duct 36 may have a relatively high temperature that can impact equipment. In the present invention, the flue gas 30 may or may not be mixed with a cooling or conditioning gas 40. The need to mix the flue gas 30 with the cooling or conditioning gas 40 depends on the temperature of the flue gas 30.

Accordingly, an inlet 42 is provided for the cooling gas 40. In FIGS. 1 and 2, the inlet is provided in the provided in the end of a conduit 44 which has an outlet 45 proximate the aperture 32 and/or the flue gas duct 36. This location is merely preferred. The cooling gas 40 may either be naturally drawn into the conduit 44 by negative pressure of the combustion chamber 18 or forced in with a separate fan (not shown). It is contemplated that a damper 46 is provided at the inlet 42 to allow for adjustments the proportion and/or rate of the cooling gas 40.

Preferably the cooling gas 40 comprises air. It has surprisingly been found that adding the relatively cool ambient air lowers the temperature of the flue gas 30 which can be then used to reduce NOx production at the burner 10. This result is surprising in part because the oxygen contained in the air would be thought to increase the flame temperature and increase NOx production. Again, however, in certain configurations it is possible to achieve the lower NOx levels without mixing the flue gas 30 with the cooling gas 40 because the flue gas is cool enough. Nevertheless, the remaining discussion may refer to the mixture of the flue gas 30 with the cooling gas 40 and it should be understood that this may just be the flue gas 30.

Figure 3:
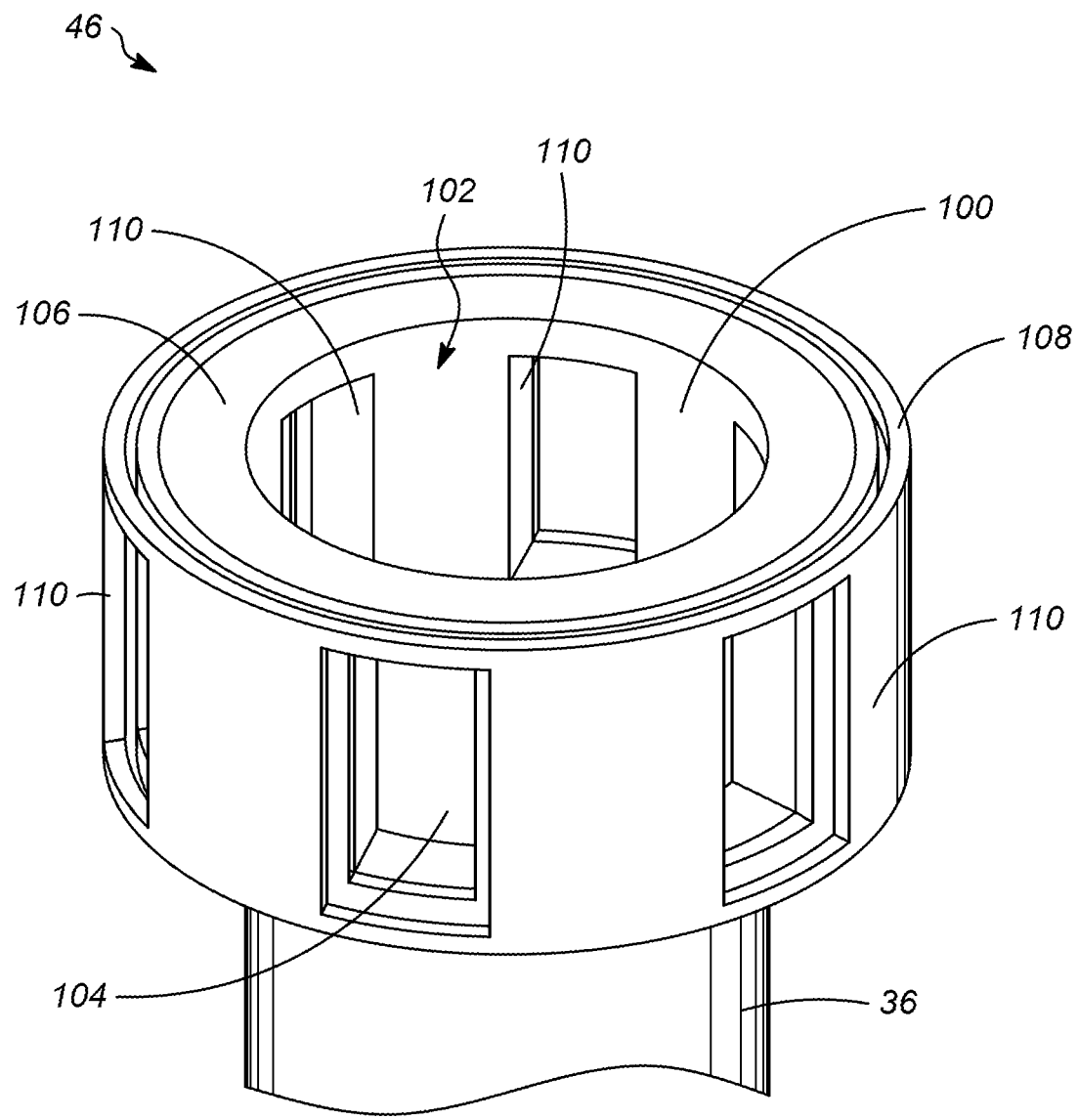
FIG. 3 is a top perspective view of a damper used in a burner according to the present invention.

Turning to FIG. 3, the damper 46 is shown which includes a body 100 with upper aperture 102 that may receive the flue gas 30 (see FIG. 1) and a lower aperture 104 in communication with duct 36. The body 100 is formed from an inner cylinder 106 and an outer cylinder 108. Both cylinders include openings 110 which function as the inlet 42 (see FIG. 1). The outer cylinder 108 is rotatable about the inner cylinder 106 so as to adjust the size of the openings 110 and thereby increase or decrease the flow or mass of the cooling gas flowing into duct 36. In the depicted damper 46, the inner cylinder 106 may formed from a thermally insulated duct that transitions to an uninsulated steel duct. The depicted damper 46 is merely preferred and it may instead, a valve or louver.

Although not depicted as such it is further contemplated that the inlet 42 may be provided in a piece of equipment, such as the heat exchanger 20, or duct 36. This may allow for the utilization of less robust equipment typically needed for such high temperature flue gas. Instead, the present invention may take advantage of the manufacturing tolerances and defects to provide cooling gas 40 to the flue gas 30.

Returning to FIGS. 1 and 2, the duct 36 may also include a damper 50 to adjust the proportion and rate of the flue gas 30. Thus, any of the above ducts, lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

For example, sensors 52 may be located in duct 36 and/or a burner housing 54. The sensors 52 may be configured to measure or obtain pressure and temperature. Additionally, the sensors 52 may be configured to detect the presence and/or concentration of a chemical species such as oxygen, NOx, carbon monoxide. Moreover, the sensors 52 may include mass or volume flow meters. The depicted positions of the sensors 52 is exemplary and the sensors may be located anywhere a measurement of a condition (pressure, temperature, species presence or concentration, flow rate, etc.) may be obtained. The various sensors 52 may be in wired or wireless communication with a controller 56 which can evaluate the measurements obtained by the sensors 52.

In other words, signals, measurements, and/or data generated or recorded by sensors 52, or other pieces of equipment like the heat exchanger 20, may be transmitted to the controller 56 which may be a computer device or system.

Computing devices or systems may include at least one processor and memory storing computer-readable instructions that, when executed by the at least one processor, cause the one or more computing devices to perform a process that may include one or more steps. For example, the one or more computing devices may be configured to receive, from one or more sensors 52, data related to the flue gas in the duct 36. The one or more computing devices or systems may be configured to analyze the data. Based on analyzing the data, the one or more computing devices or systems may be configured to determine one or more recommended adjustments to one or more parameters or conditions of one or more processes described herein. The one or more computing devices or systems may be configured to transmit encrypted or unencrypted data that includes the one or more recommended adjustments to the one or more parameters of the one or more processes described herein.

The computing device may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RANI), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by the controller or a computing device.

The methods and steps described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for control gas flow to a burner described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Returning to FIGS. 1 and 2 the mixture of flue gas 30 and cooling air 40 in duct 36 may be passed to the heat exchanger 20 where it may be cooled further by the combustion air 12 before being fully mixed with the combustion air and the fuel gas. More, specifically, the fan 34 may inject the mixture of flue gas 30 and cooling air 40 into the burner housing 54. This recycled flue gas may be mixed at any number of locations.

For example, as described in more detail in U.S. patent application Ser. No. 17/451,933 filed on Oct. 22, 2021, the mixture of flue gas 30 and cooling air 40 may be mixed with the combustion air before it is mixed with the fuel gas, or mixed with the fuel gas before it is mixed with the combustion air, or may be mixed with a portion of the combustion air that bypasses the mixing and fuel gas. Moreover, the mixture of flue gas 30 and cooling air 40 may be directed at one location or proportioned among the several mixing locations inside the burner 10 or combustion chamber 18.

The proportions of the mixture of flue gas 30 and cooling air 40 delivered to various locations may be: in permanently fixed proportions, based on injection conduit of fixed geometry; in manually adjustable proportions by way of manual valves or ducting in the injection conduits; or automated proportions to facilitate automated, closed-loop control of the injection locations and proportions to minimize NOx emissions performance, maximize combustion efficiency or optimize burner flame stability. For the automated proportions, the controller 56 may send signals to the fan 34, the dampers 22, 46, 50, or other pieces of equipment to adjust a flow rate of any of the various streams.

With reference to FIG. 2, often, the coolest flue gas in extremely hot furnaces, such as ethane crackers (sometimes over 1,150° C. (2,100° F.) combustion chamber flue gas), is found in a return bin 60 or header box at the floor 28 of the combustion chamber 18. As shown in FIG. 2, the return bin 60 is a well or trough at the floor 28 of the combustion chamber 18, usually running the whole length (or circumference of round heaters) of the combustion chamber 18 that contains tube guides 62 or other tube supporting structures and provides some shielding from radiant heat for these supports.

As it is at the floor 28 of the combustion chamber 18 and the combustion chamber 18 is operated at pressure slightly less that atmospheric (around greater than 1" w.c. negative) any atmospheric air entering the combustion chamber 18, from intended or unintended breaches in the combustion chamber 18 casing, will be cooler and more dense than the surrounding flue gas and tends to fall to the floor and into these return bins 60. Therefore, not only the coolest gas, but also the highest oxygen level flue gas resides at the floor 28 of the combustion chamber 18 in in these return bins 60. And since these return bins 60 are designed to use the process tubes 24, and often further refractory material to shield the tube guides 62 and supports from direct radiant heat, these same features will shield the flue gas extraction duct 36 from direct radiant heat.

Further, the return bins 60 are often conveniently located directly adjacent to the burners 10 facilitating very short, ducting and conveniently located conditioning air inlet and in-duct damper 46 adjustments.

The outlet 45 for the cooling air 40 out can be located just about anywhere convenient along the return bin 60 and one outlet 45 may serve several individual burner conditioned flue gas ducts 36 as the mixing of the cooling air 40 and the flue gas 30 may occur in the return bin 60 itself.

While the outlet 45 for the cooling air 40 is an intended opening in the combustion chamber 18, there always exist some amount of unintended air leakage into the combustion chamber 18. In a design or field assessment of the combustion chamber 18, the amount and rate of air leakage can be determined, and this amount of air leakage will be deducted from the amount needed to enter through the intended conditioning air inlet 42. In some cases, all the cooling air may enter the combustion chamber 18 through air leakage, as unintended or tramp air and no provision for any additional inlets 42 are required.

The cooling gas or air can also be air draw into the combustion chamber 18 that is operated at internal pressures which are below atmospheric pressure, which may be the case in process heaters and furnaces in petrochemical or refinery service. This drawn-in air is often referred to a "leakage" or "tramp air" and, being cooler and denser than the hot flue gas within the combustion chamber 18, naturally flows down and pools at the bottom of the combustion chamber 18. This leakage air can interfere with internal flue gas recirculation burners and increase NOx production by increasing the partial pressure of oxygen in the recirculated flue gas. However, the leakage air can serve as cooling air and by cooling the flue gas that duct 36, reducing or eliminating the need for or reducing the cost of the heat exchanger 20.

In some cases, especially lower temperature combustion chambers 18 situations, for example below 982° C. (1,800° F.), the cooling air 40 may be needed not for controlling temperature to the heat exchanger 20. However, it may still be desired, or even needed, to control the stoichiometry of the directed locations within the burner 10.

As will be appreciated, the damper 50 in duct 36 and the damper 46 at the inlet 42 for the cooling gas 40 are not requirements and instead may be fixed apertures, inlet louvers or openings, and duct, heat exchanger and fan sizing and placement may be used without adjustment. In other embodiments, these two dampers 50, 46 may be responding to signals from the controller 56, sometimes automatic or cyclically, to adjust or change the temperature, flow rate and/or oxygen content of the flue gas 30 in duct 36.

In all these systems, the burner flame, other than NOx production, is essentially agnostic to whether or not the fan 34 is circulating flue gas or not. While the rate of flue gas recirculated and its oxygen content may be proportional to the overall NOx emissions of the burner 10, the burner 10 can be operated in a safe and stable manner regardless of where the system is or is not circulating flue gas 30 and regardless of the rate and oxygen content of the recirculated flue gas.

Turning to FIGS. 4A and 4B, it is contemplated that a portion 36a of the mixture of flue gas 30 and cooling air 40 may be diverted from the duct 36 the combustion air, upstream of the heat exchanger 20 to moderate or control approach temperature to either or both the hot (flue gas) or cold (combustion air inlet) side of the heat exchanger 20. For example, the portion 36a may be injected into the duct with the combustion air 12.

Control of the portion 36a may be accomplished with a valve(s) in the conditioned flue gas duct 36. Or the flue gas bypassing the heat exchanger 20 may be controlled automatically with valve(s) (not shown) in the ductwork that are automated on temperature or flow control to deliver the proper flow rate and/or temperature of the mixture of flue gas 30 and cooling gas 40 to the burner 10.

Additionally, as shown in FIG. 4B, a portion 12a of the combustion air 12 may be mixed into duct 36 if needed. This flow could also be adjusted or controlled with a valve (not shown).

Figure 5:
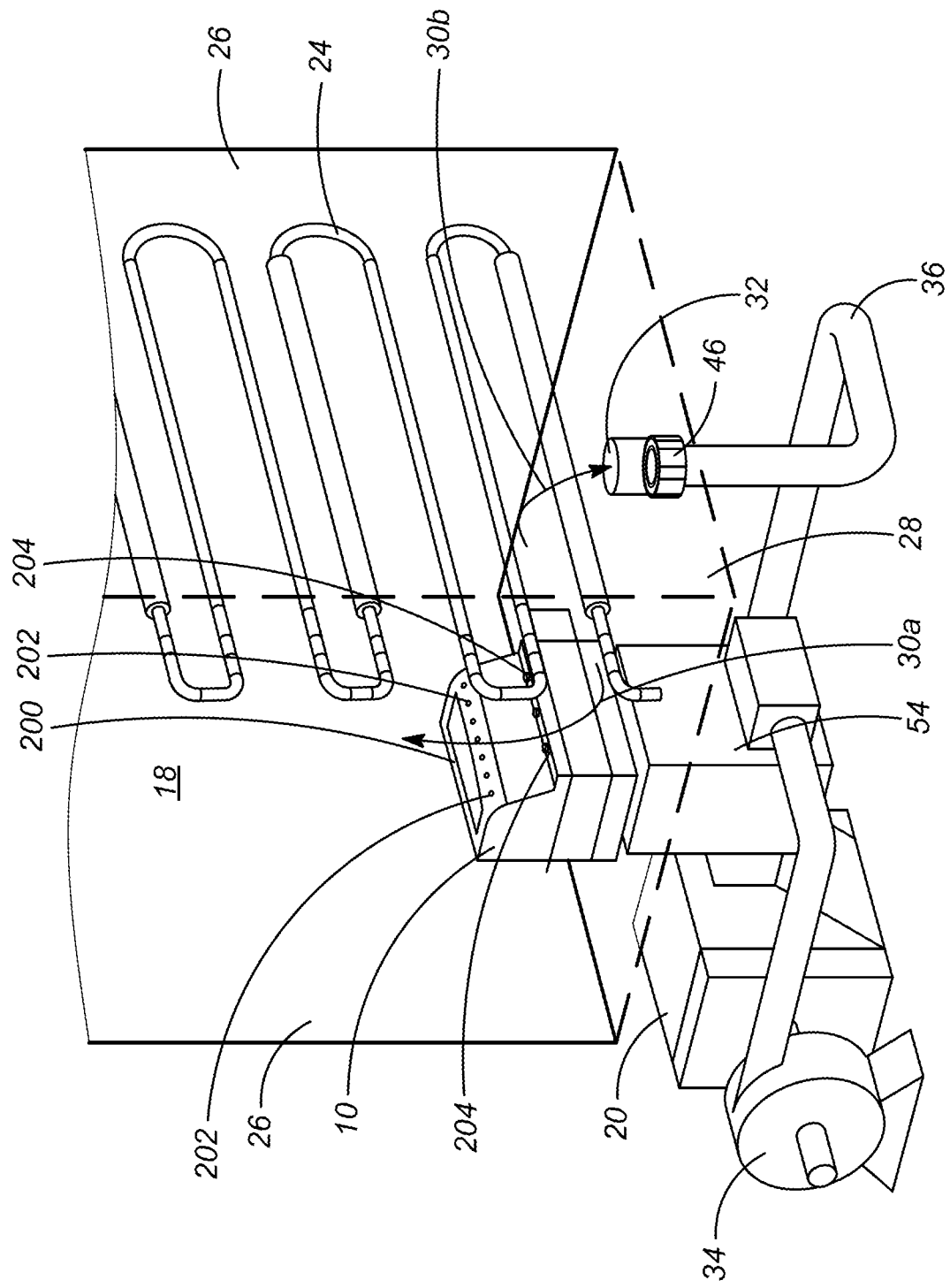
FIG. 5 is a front and side, partially cutaway view of a combustion zone with a burner according to the present invention.
Figure 6:
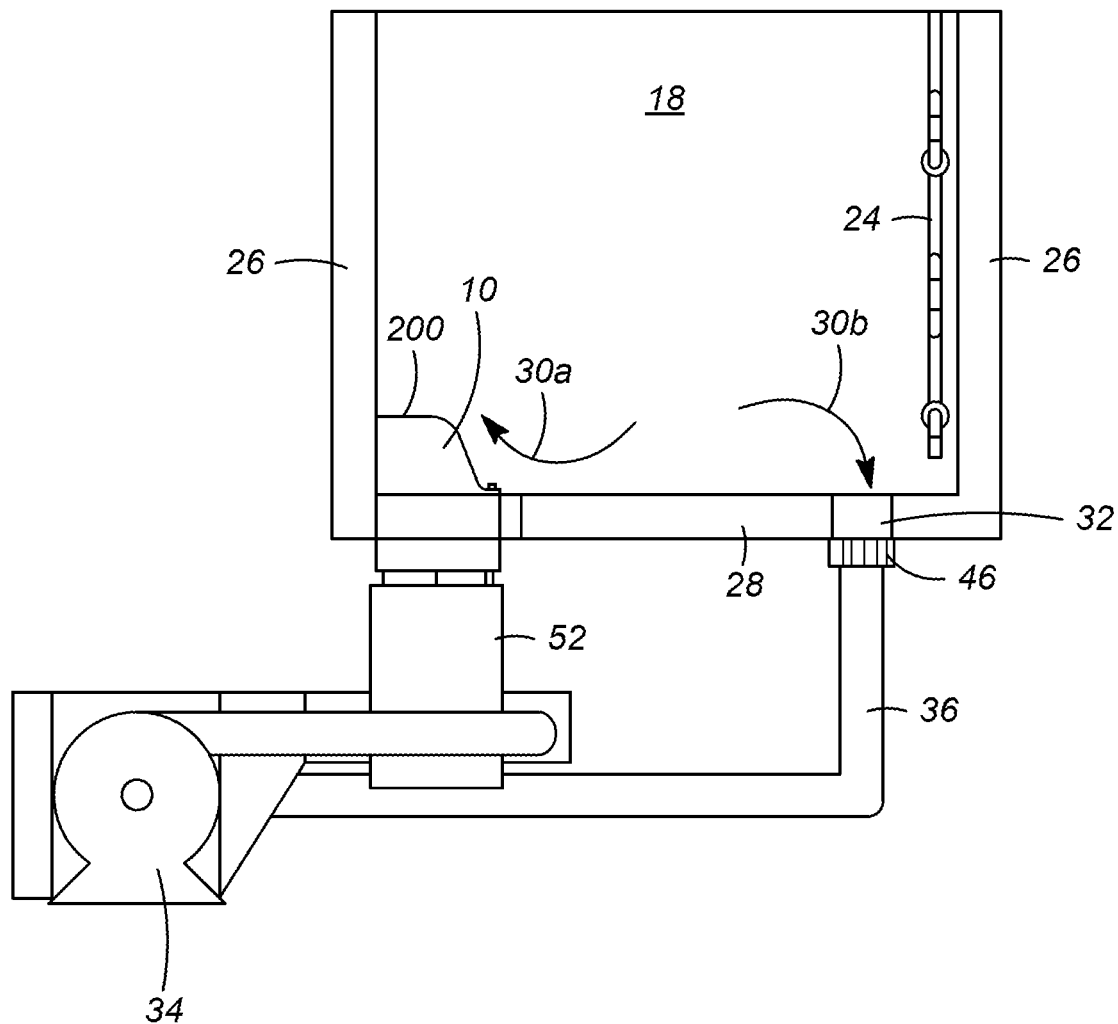
FIG. 6 is a side view of the combustion zone of FIG. 5.

Turning to FIGS. 5 and 6, a preferred embodiment according to the present invention is shown. Unless explained otherwise, the same reference numerals are used to depict the same elements of this embodiment as with previous embodiments. The depicted embodiment utilizes both internally recycled flue gas and externally recycled flue gas (that has been conditioned or cooled) to reduce NOx production. Moreover, it should be appreciated that while this application depicts up-fired, floor-mounted burners, this invention also can be applied to down-fired, radiant wall-fired, horizontal-fired or burners of any firing orientation as well forced or natural draft applications.

The burner 10 in FIGS. 5 and 6 is a staged injection burner in which a majoring of the combustion air 12 is injected into a primary combustion zone 200. A first portion of the fuel/combustion air is injected into the primary combustion zone 200 via injection ports 202. A secondary, or staged, injection of fuel/combustion air is made via secondary ports 204 located lower on the burner 10.

As discussed above, the staged injection, as it moves up to the primary combustion zone 200, will draw with it a portion 30a of the flue gas within the combustion chamber 18. This "internally" recycled flue gas will act to reduce the NOx production at the flame produced in the primary combustion zone 200. However, to further reduce the NOx production, the burner 10 also utilizes an externally recycled flue gas.

Accordingly, a second portion 30b of the flue gas is drawn, by fan 34, down through aperture 32 or breach in the floor 28 and into duct 36. On the side of the floor 28 outside of combustion chamber 18, a damper 46 allows cooling gas 40 (ambient air) to be drawn in and mixed with the second portion 30b of the flue gas being pulled into the duct 36.

The mixture of flue gas and cooling gas in duct 36 may be cooled further by being passed though the heat exchanger 20 before being passed into the burner housing 54 to be injected at one or more desired location as discussed above.

Thus, the burner 10 of FIGS. 5 and 6, uses both the internally recycled flue gas, as well as flue gas that is removed from the combustion chamber 18 to achieve a flame with reduced NOx production. Additionally, the use of the cooling gas 40 reduces the temperature to allow for equipment that is less costly and made from more common materials.

This burner, and method of using same, utilizes cooling or conditioning gas to not only reduce the temperature of the mixture of air and flue gas to protect the ducting, heat exchanger and fan from excessive temperatures, but also to introduce a prescribed amount of the combustion air required in the targeted area of the burner.

Furthermore, NOx produced in a burner is a function of several variables including, but not limited to, fuel gas composition, combustion chamber (firebox) temperature, excess air, combustion air temperature and the style and exact design of the burners. For example, changing the fuel gas from 100% hydrocarbon source, such as methane, to 100% hydrogen can increase the flame temperature and increase NOx production by 30% to 60%, depending on burner style and design. For example, increasing the firebox (combustion chamber, bridgewall, radiant section) temperature from 871 to 1,150° C. (1,600 to 2,100° F.) may double or even triple the NOx production. Additionally, increasing the excess air from 10% excess air to 20% may have a lesser effect of increasing NOx—on an order of 15% to 20%. Furthermore, increasing the combustion air temperature from 15.5 to 260° C. (60 to 600° F.) may increase the NOx emissions 30% to 80%.

Meanwhile, changing the fuel gas composition to the burners changes the flame emissivity and radiance, the intensity at which the flame radiates heat from the hot gasses in and around the flame to the heat transfer surfaces (process tubes) in the radiant section (the combustion chamber). Thus, for a given firing rate, the firebox temperature changes as the fuel gas composition changes.

Further, changing the fuel gas composition from hydrocarbons, for example natural gas, to hydrogen reduces the isothermal volumetric flow rate out of the radiant section and through the convection section by about 10% while reducing the mass flow rate by nearly 20%. The efficiency and the effectiveness of the convection section to transfer heat is directly proportional to the mass flow rate through the convection section (Q=mc ΔT). As the mass flow rate through the convection section changes, so does that of the interconnected or integral air preheat system, or economizer, which scavenges heat from the flue gas and transfers it to the combustion air. So as the mass flow rate changes though the convection section and air preheater, the combustion air temperature changes, as well.

Therefore, a boiler, furnace or heater is most optimally designed to deliver a specific heat transfer rate to a process fluid for a specific fuel gas composition or range of compositions. Significantly altering the fuel gas composition can significantly change the efficiency and effectiveness of the fired heater or boiler to heat the process at the desire rate to the desired temperature or, in the case of an in-tube reacting furnace such as an ethylene cracking furnace, deliver the process yield and conversion necessary to satisfy performance requirements.

One method of increasing the mass flow rate of a burner and heater system running on hydrogen fuel so that it matches the mass flow rate of a burner and heater designed for hydrocarbon fuel, like natural gas, is to run at higher excess air. For example, a natural gas burner designed to operate at 10% excess air may be operated at 15% to 25% excess air on pure hydrogen to match the firebox temperature and mass flow rate to achieve similar overall furnace efficiency and yield. However, running at the higher excess air and on the hydrogen fuel both will likely contribute to higher NOx production and emissions from the heater, depending on the burner design employed.

Another method of increasing the mass flow rate of a burner and heater system running hydrogen fuel so that it matches the mass flow rate of a burner and heater designed for hydrocarbon fuel, like natural gas, is to recirculate relatively cool flue gas from the stack, downstream of the convection section and air preheater and back into the combustion air stream with a fan and ducting system. This is termed external flue gas recirculation. External flue gas recirculation systems are sized and designed to modulate and control the rate of recirculated flue gas to simultaneously load up the convection section of the heater and reduce NOx emissions by reducing the partial pressure of oxygen in the combustion air.

As described above, external flue gas recirculated flue gas from downstream of the convection section can be employed to target the injection, thereby minimizing the rate of flue gas recirculation needed, thus minimizing the size of the external flue gas recirculation fan and ducting needed to achieve required NOx emission limits while increasing the mass flow rate to required levels to whatever level needed to achieve required heat transfer rates. Therefore, the mass flow rate of flue gas recirculation can be designed and controlled for heat transfer purposes rather than NOx mitigation purposes with the present burner.

However, in some cases, the mass flow rate through the convection section is the limiting variable in the overall furnace or heater process and any increase in mass flow rate from external flue gas recirculation is not permissible for either process design or economic reasons. In cases where any increase in mass flow rate via external flue gas recirculation is not feasible and increased excess air is the preferred or sole means of increasing the system mass flow rate, the forced, targeted internal flue gas recirculation, described above may be a preferred method of modulating the system mass flow while simultaneously controlling NOx.

Figure 7A:
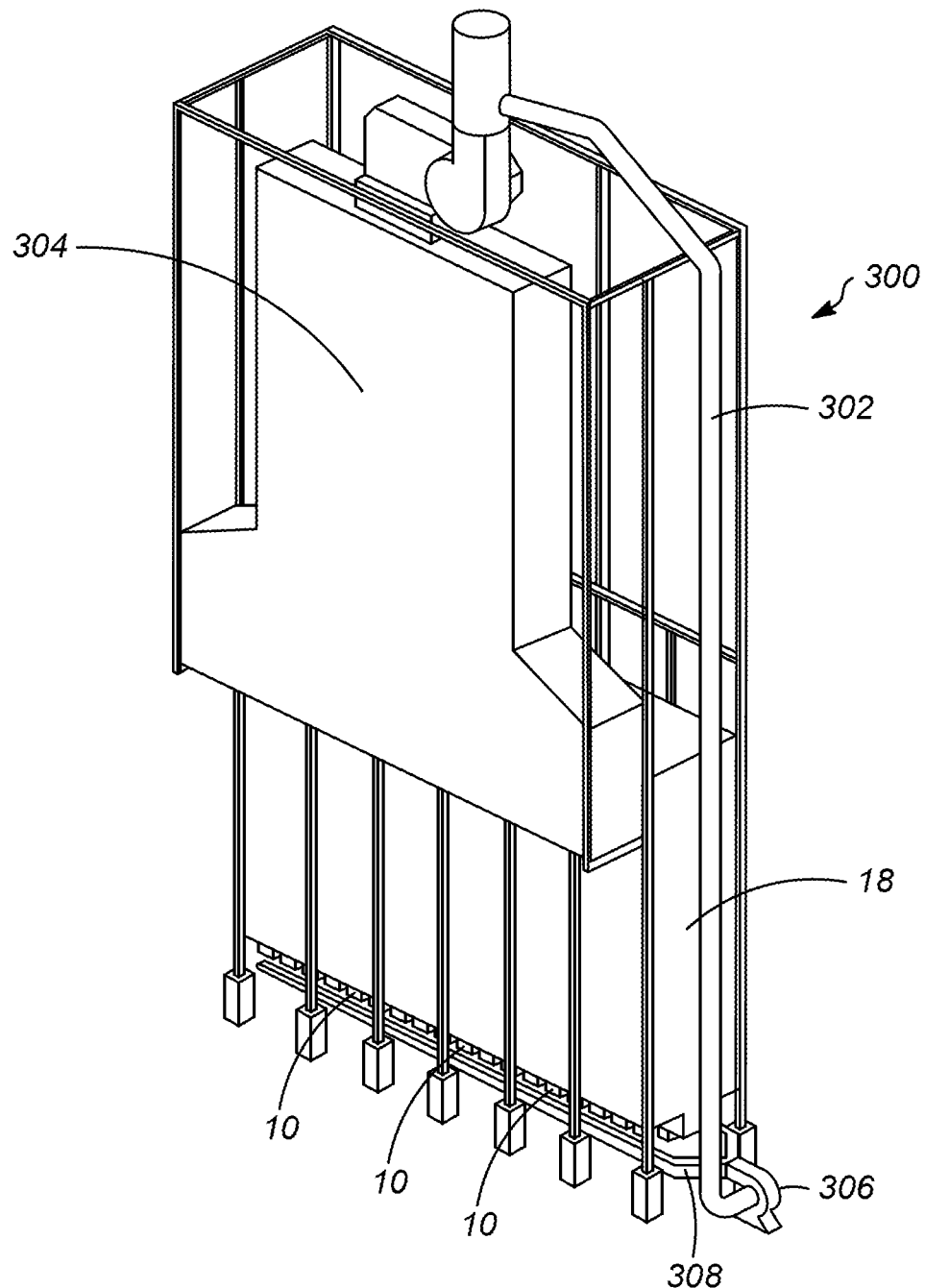
FIG. 7A is a side perspective view of a heating zone according to one or more aspects of the present application.
Figure 7B:
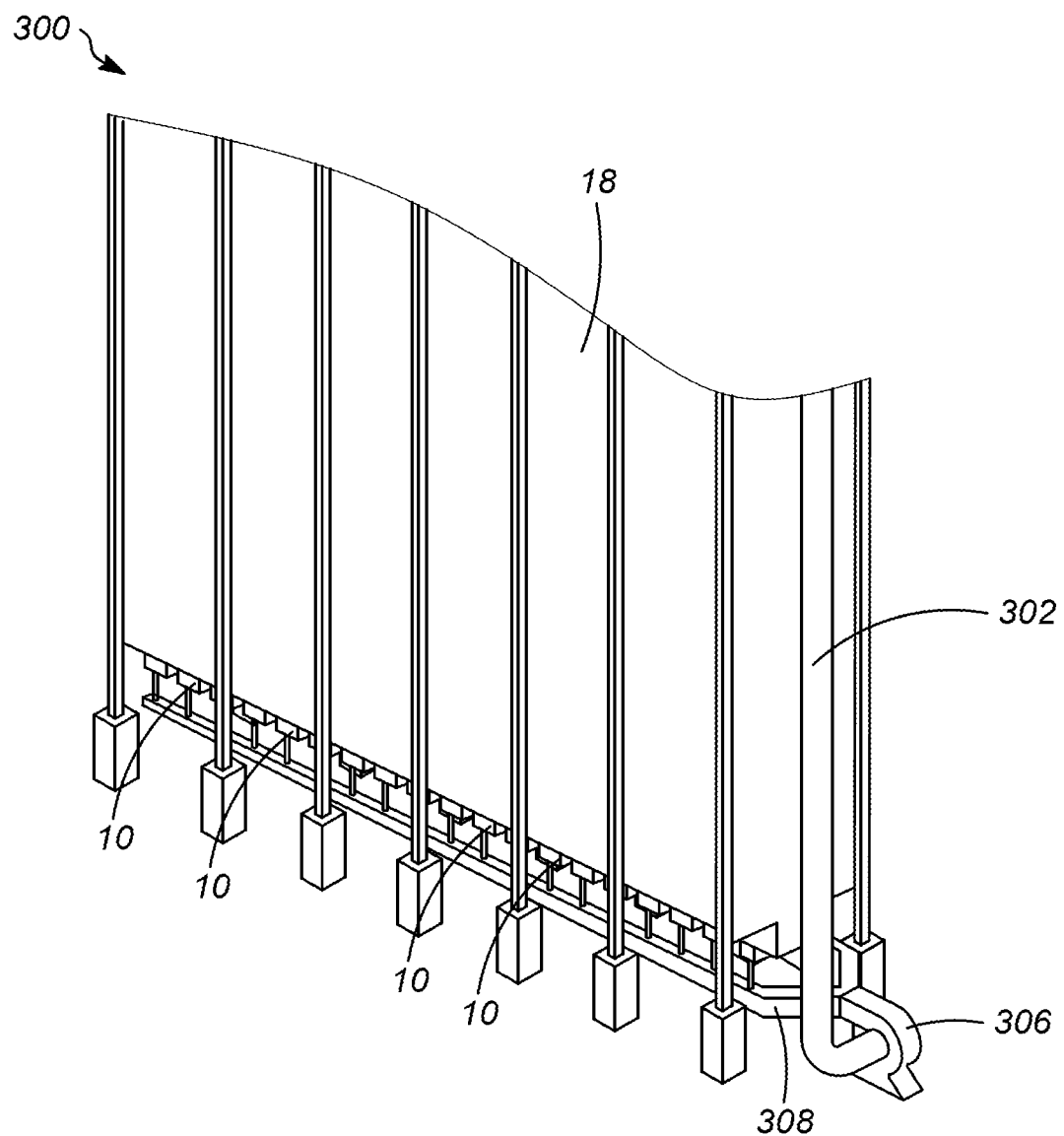
FIG. 7B is a close up of a portion of the heating zone of FIG. 7B.
Figure 8:
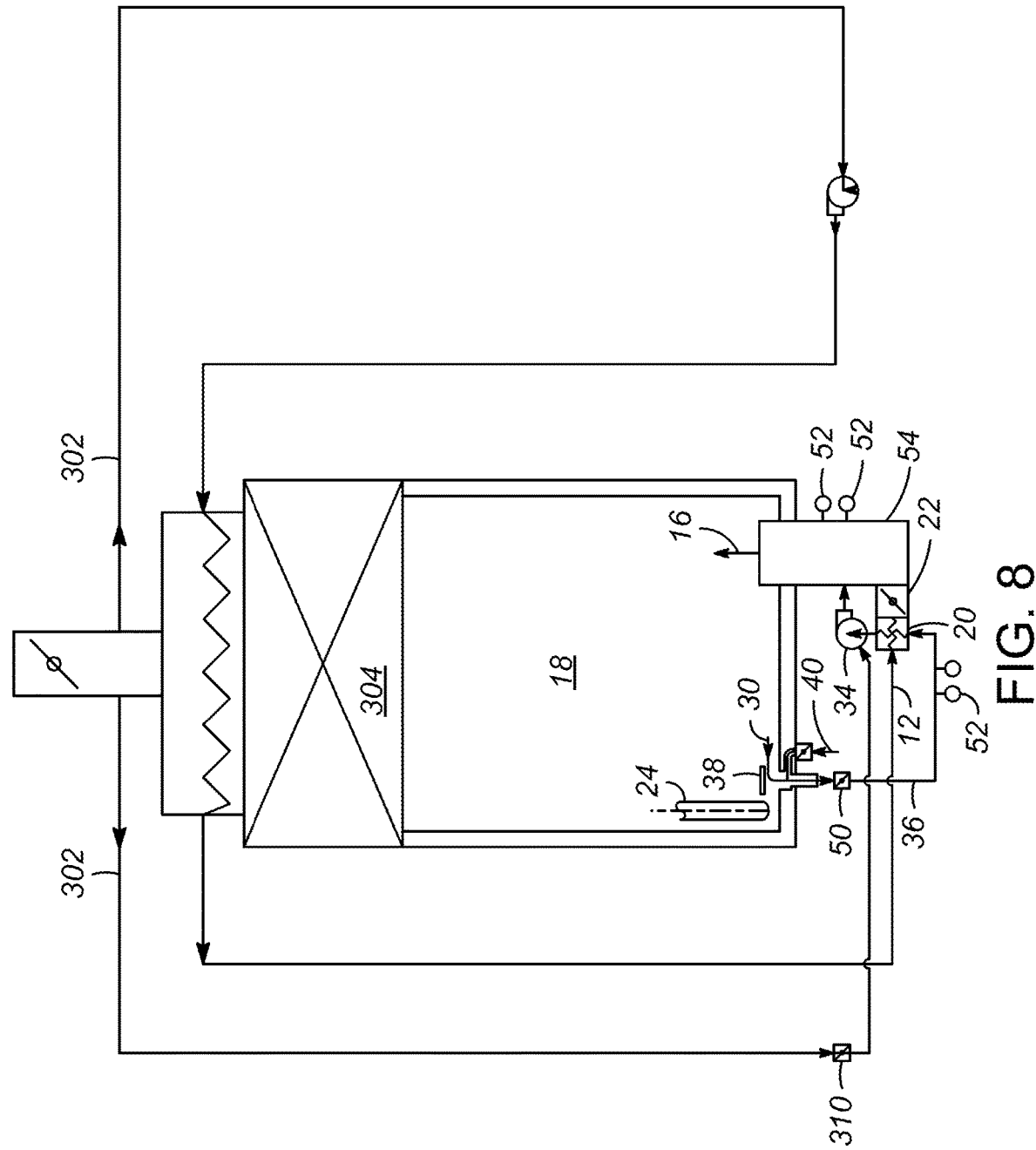
FIG. 8 is a side, cutaway view of another heating zone according to one or more aspects of the present application.

Turning to FIGS. 7A, 7B, and 8, a heating system 300 according to various embodiments of the present invention is shown. Unless explained otherwise, the same reference numerals are used to depict the same elements of this embodiment as with previous embodiments.

In the depicted system 300, an external duct 302 is configured to remove or recover a portion of the flue gas produced from the burner 10, after the flue gas has passed through the convection section or convection zone 304 of the heating system 300. As is known, the convection section 304 is located downstream (relative to the flow of flue gas) of the combustion zone 18. Typically, this means that the convection section 304 is disposed above the combustion zone 18. A fan 306 may be used to pull the flue gas that has passed through the convection section 304 and an outlet of the fan 306 may be passed to a manifold 308, before the recycled flue gas may be passed to burners 10 at or near the bottom of the combustion zone 18.

It is contemplated that the recycled flue gas, is a blend of flue gas from downstream of the convection section 304 and the forced, targeted flue gas (with or without cooling air) directly drawn from the combustion zone 18. This blended flue gas embodiment facilitates precisely drawing sufficient flue gas from downstream of the convection section 304 and directly from the combustion zone 18 to achieve precise loading of the convection section and minimal NOx emissions. Thus, the heating system in FIGS. 7A, 7B, and 8 allows for flue gas to be recycled from both the combustion zone 18 and the convection section 304. As shown in FIG. 8, a damper 310 may be in duct 302 to allow for the amount of flue gas in duct 302 to be adjusted. The ratio of the portion of the flue gas from the combustion zone 18 to the portion of the flue gas that has passed through the convection section 304 may range between 100:0 to 0:100.

Moreover, it is contemplated that such a system is particularly advantageous in burners which receive fuel that fluctuates or is changed from hydrocarbon to hydrogen. The present heating system may be utilized to mitigate firing and NOx production.

More specifically the controller 56 may be used to determine the excess air and flue gas recirculation rates needed to deliver the system heat delivery, mass flow rate and NOx emissions required. The controller 56 may take into account, the style of the burner, the burner design, and any conditions affecting combustion including, but not limited to fuel gas composition, combustion chamber (firebox) temperature, excess air, NOx emissions, and the combustion air temperature.

The controller 56 may be used to determine optimal settings for simultaneously achieving process heat transfer and emissions requirements. The controller 56 may also advise operators of optimal settings or automatically drive the system to those optimal settings. Operational conditions that may be adjusted by the controller include, but are not limited to, burner firing rate, excess combustion air, flue gas recirculation rates, flue gas source (direct form firebox or downstream of combustion chamber), tempering air injection rate, the amount or proportion of fuel and air staging in the burner and flue gas target location inside the burner.

Accordingly, as the burner receives new and different, even previously unenvisioned fuel gas compositions and/or process requirements, the controller may predict and advise or automatically control aspects of the burner to new operational setpoints or advise whether or not those new operation targets are beyond current equipment capabilities.

Therefore, in a large petrochemical and petroleum refinery complex where fossil hydrocarbons are being refined into petrochemicals, plastics and fuels with dozens of heaters, furnaces and boilers all using synthesized fuel gases such as refinery fuel gas or purchased fuels such as natural gas. As this complex is migrated from fossil to renewable feedstocks, feedstocks, the quantity and composition of the fuel gases synthesized from those feedstock changes. The refinery fuel gases, off gases and waste gas streams that feed the fuel gas system all change as the composition of the feedstock changes. Further, some or all of these fuel gases can be further processed to remove the carbon and produce streams hydrogen and other low or no carbon fuel gases such as ammonia. These low or no carbon fuel gases may then be fed back to those same burners, heaters, furnaces, and other heating systems.

These present burners may also be used to optimize the performance of or eliminate the need for selective catalytic reduction ("SCR") systems. SCRs are post combustion treatment systems that react ammonia with NOx at specific flue gas oxygen levels and temperatures, in the presence of a catalyst, to reduce NOx to molecular nitrogen. For example, if an existing SCR system with hydrocarbon fuels is reducing 60 ppm NOx to 5 ppm using conventional burners, coupled with these invented burners, 2 ppm NOx may now be achievable. And if the NOx goal is achieving sub-15 ppm NOx, where 60 ppm NOx is achieved with conventional burners, these invented burners can eliminate the need for an SCR.

Specific Embodiments

While the following is described in conjunction with specific embodiments, it will be understood that this description is intended to illustrate and not limit the scope of the preceding description and the appended claims.

A first embodiment of the invention is a burner configured to receive a fuel gas and a combustion air which react and produce a flame and a flue gas in a combustion zone, the burner comprising a duct configured to remove a portion of the flue gas from the combustion zone as a recycled flue gas, wherein the recycled flue gas is mixed, upstream of the combustion zone, with the fuel gas and the combustion air. An embodiment of the invention is one, any or all of prior embodiments in this paragraph up through the first embodiment in this paragraph, further comprising an inlet configured to provide a cooling gas to the recycled flue gas, wherein the cooling gas is provided to the recycled flue gas upstream of the mixing of the recycled flue gas with the fuel gas and the combustion air. An embodiment of the invention is one, any or all of prior embodiments in this paragraph up through the first embodiment in this paragraph, wherein the cooling gas comprises air. An embodiment of the invention is one, any or all of prior embodiments in this paragraph up through the first embodiment in this paragraph, wherein the inlet is formed in a piece of equipment. An embodiment of the invention is one, any or all of prior embodiments in this paragraph up through the first embodiment in this paragraph, wherein the inlet is formed as an end of a conduit. An embodiment of the invention is one, any or all of prior embodiments in this paragraph up through the first embodiment in this paragraph, wherein the inlet comprises an adjustable damper. An embodiment of the invention is one, any or all of prior embodiments in this paragraph up through the first embodiment in this paragraph, wherein the inlet is disposed in a floor or a wall of the combustion zone. An embodiment of the invention is one, any or all of prior embodiments in this paragraph up through the first embodiment in this paragraph, further comprising a heat exchanger, wherein the heat exchanger receives the combustion air and the recycled flue gas and is configured to transfer heat from the recycled flue gas to the combustion air. An embodiment of the invention is one, any or all of prior embodiments in this paragraph up through the first embodiment in this paragraph, wherein a portion of the recycled flue gas is mixed with at least a portion of the combustion air, or the cooling air, or both, upstream of the heat exchanger. An embodiment of the invention is one, any or all of prior embodiments in this paragraph up through the first embodiment in this paragraph, further comprising at least one sensor configured to measure a condition of a mixture of the recycled flue gas and the cooling gas. An embodiment of the invention is one, any or all of prior embodiments in this paragraph up through the first embodiment in this paragraph, further comprising a fan configured to draw the recycled flue gas out of the combustion zone.

A second embodiment of the invention is a process for reducing production of NOx gases at a burner, the process comprising injecting a fuel gas into a combustion zone; injecting a combustion air into the combustion zone, wherein the combustion air and the fuel gas react and produce a flame and a flue gas in the combustion zone; recovering a portion of the flue gas from the combustion zone as a recycled flue gas to be mixed, upstream of the combustion zone, with the fuel gas, the combustion air, or both. An embodiment of the invention is one, any or all of prior embodiments in this paragraph up through the second embodiment in this paragraph, further comprising mixing the recycled flue gas with a cooling gas before the recycled flue gas is mixed with the fuel gas, the combustion air, or both. An embodiment of the invention is one, any or all of prior embodiments in this paragraph up through the second embodiment in this paragraph, wherein the cooling gas comprises air. An embodiment of the invention is one, any or all of prior embodiments in this paragraph up through the second embodiment in this paragraph, wherein the cooling gas and the recycled flue gas are mixed in the combustion zone. An embodiment of the invention is one, any or all of prior embodiments in this paragraph up through the second embodiment in this paragraph, further comprising adjusting a flow rate of the cooling gas. An embodiment of the invention is one, any or all of prior embodiments in this paragraph up through the second embodiment in this paragraph, wherein the flow rate is adjusted based on a condition of a mixture of the recycled flue gas and the cooling gas. An embodiment of the invention is one, any or all of prior embodiments in this paragraph up through the second embodiment in this paragraph, further comprising cooling, in a heat exchanger, the recycled flue gas with the combustion air. An embodiment of the invention is one, any or all of prior embodiments in this paragraph up through the second embodiment in this paragraph, wherein the recycled flue gas in the heat exchanger is mixed with the cooling gas. An embodiment of the invention is one, any or all of prior embodiments in this paragraph up through the second embodiment in this paragraph, further comprising mixing a portion of the recycled flue gas with the combustion air upstream of the heat exchanger. An embodiment of the invention is one, any or all of prior embodiments in this paragraph up through the second embodiment in this paragraph, further comprising adjusting a flow rate of the recycled flue gas. An embodiment of the invention is one, any or all of prior embodiments in this paragraph up through the second embodiment in this paragraph, wherein the flow rate of the recycled flue gas is adjusted based on a condition of a mixture of the recycled flue gas and the cooling gas.

A third embodiment of the invention is a burner configured to receive a fuel gas and a combustion air which react and produce a flame and a flue gas in a combustion zone, the burner comprising primary injection ports configured to inject fuel gas into a primary combustion zone; secondary injection ports spaced from the primary combustion zone and configured such that as fuel gas is injected a first portion of the flue gas is drawn to the primary combustion zone; and, a duct configured to remove a second portion of the flue gas from the combustion zone and return the second portion of the flue gas to the primary combustion zone. An embodiment of the invention is one, any or all of prior embodiments in this paragraph up through the third embodiment in this paragraph further comprising an inlet configured to provide a cooling gas to the second portion of the flue gas in the duct. An embodiment of the invention is one, any or all of prior embodiments in this paragraph up through the third embodiment in this paragraph, wherein the second portion of the flue gas has passed through a convection zone disposed above the combustion zone. An embodiment of the invention is one, any or all of prior embodiments in this paragraph up through the third embodiment in this paragraph, wherein the duct that provides the second portion of the flue gas provides flue gas to a plurality of burners. An embodiment of the invention is one, any or all of prior embodiments in this paragraph up through the third embodiment in this paragraph, further comprising a second duct configured to remove a third portion of the flue gas and return the third portion of the flue gas to the primary combustion zone.

A fourth embodiment of the invention is a heating system comprising a burner configured to receive a fuel gas and a combustion air which react and produce a flame and a flue gas in a combustion zone; a duct configured to remove a first portion of the flue gas from the combustion zone as a recycled flue gas, wherein the first portion of the flue gas is mixed, upstream of the combustion zone, with the fuel gas and the combustion air; and a second duct configured to remove a second portion of the flue gas from the heating system, wherein the second portion of the flue gas has passed through a convection zone of the heating system, wherein the convection zone is disposed downstream from the combustion zone, and wherein the second portion of the flue gas is mixed, upstream of the combustion zone, with the fuel gas and the combustion air. An embodiment of the invention is one, any or all of prior embodiments in this paragraph up through the fourth embodiment in this paragraph, further comprising an inlet configured to provide a cooling gas to the first portion of the flue gas, wherein the cooling gas is provided to the first portion of the flue gas upstream of the mixing of the first portion of the flue gas with the fuel gas and the combustion air. An embodiment of the invention is one, any or all of prior embodiments in this paragraph up through the fourth embodiment in this paragraph, further comprising a sensor configured to obtain information relating to a composition of the fuel gas. An embodiment of the invention is one, any or all of prior embodiments in this paragraph up through the fourth embodiment in this paragraph, further comprising a controller configured to adjust an operational condition associated with the burner based on the composition of the fuel gas.

A fifth embodiment of the invention is a method of controlling a burner, the method comprising reacting, in a combustion zone of a heating system, a fuel gas and a combustion air to produce a flame and a flue gas; removing a first portion of the flue gas from the combustion zone as a recycled flue gas; mixing the first portion of the flue gas, upstream of the combustion zone, with the fuel gas and the combustion air; removing a second portion of the flue gas from the heating system, wherein the second portion of the flue gas has passed through a convection zone, wherein the convection zone is downstream of the combustion zone; and, mixing the second portion of the flue gas, upstream of the combustion zone, with the fuel gas and the combustion air. An embodiment of the invention is one, any or all of prior embodiments in this paragraph up through the fifth embodiment in this paragraph, further comprising determining a composition of the fuel gas. An embodiment of the invention is one, any or all of prior embodiments in this paragraph up through the fifth embodiment in this paragraph, further comprising adjusting an operational condition associated with the burner based on the composition of the fuel gas. An embodiment of the invention is one, any or all of prior embodiments in this paragraph up through the fifth embodiment in this paragraph, wherein the operational condition comprises a ratio of the first portion of the flue gas to the second portion of the flue gas. An embodiment of the invention is one, any or all of prior embodiments in this paragraph up through the fifth embodiment in this paragraph, further comprising mixing a cooling gas with the first portion of the flue gas, wherein the cooling gas is mixed with the first portion of the flue gas upstream of the mixing of the first portion of the flue gas with the fuel gas and the combustion air. An embodiment of the invention is one, any or all of prior embodiments in this paragraph up through the fifth embodiment in this paragraph, wherein the operational conditional comprises an amount of cooling gas mixed with the first portion of the flue gas. An embodiment of the invention is one, any or all of prior embodiments in this paragraph up through the fifth embodiment in this paragraph, wherein the operational conditional comprises a flow rate of cooling gas. An embodiment of the invention is one, any or all of prior embodiments in this paragraph up through the fifth embodiment in this paragraph, further comprising monitoring one or more conditions, wherein the one or more conditions comprise a temperature of a process fluid within process tubes in the combustion zone of the fuel gas; a temperature of the flame; and an amount of NOx in the flue gas. An embodiment of the invention is one, any or all of prior embodiments in this paragraph up through the fifth embodiment in this paragraph, further comprising adjusting an operational condition associated with the burner based on the one or more conditions. An embodiment of the invention is one, any or all of prior embodiments in this paragraph up through the fifth embodiment in this paragraph, wherein the operational condition comprises a ratio of the first portion of the flue gas to the second portion of the flue gas. An embodiment of the invention is one, any or all of prior embodiments in this paragraph up through the fifth embodiment in this paragraph, further comprising mixing a cooling gas with the first portion of the flue gas, wherein the cooling gas is mixed with the first portion of the flue gas upstream of the mixing of the first portion of the flue gas with the fuel gas and the combustion air. An embodiment of the invention is one, any or all of prior embodiments in this paragraph up through the fifth embodiment in this paragraph, wherein the operational conditional comprises a flow rate of cooling gas.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A burner configured to receive a fuel gas and a combustion air which react and produce a flame and a flue gas in a combustion zone, the burner comprising:
   primary injection ports configured to inject a fuel gas into a primary combustion zone;
   secondary injection ports spaced from the primary combustion zone and configured such that as fuel gas is injected and a first portion of the flue gas is drawn to the primary combustion zone;
   a duct configured to remove a second portion of the flue gas from the combustion zone and return the second portion of the flue gas to the primary combustion zone, and,
   an inlet configured to provide a cooling gas to the first portion of the flue gas,
   wherein the first portion of the flue gas is mixed, upstream of the combustion zone, with the fuel gas and the combustion air and the cooling gas is provided to the first portion of the flue gas upstream of mixing of the first portion of the flue gas with the fuel gas and the combustion air.

2. The burner of claim 1, further comprising: an inlet configured to provide a cooling gas to the second portion of the flue gas in the duct.

3. The burner of claim 2, wherein the second portion of the flue gas has passed through a convection zone disposed above the combustion zone.

4. The burner of claim 3, wherein the duct that provides the second portion of the flue gas provides flue gas to a plurality of burners.

5. The burner of claim 2, further comprising: a second duct configured to remove a third portion of the flue gas and return the third portion of the flue gas to the primary combustion zone.

6. A heating system comprising:
   a burner configured to receive a fuel gas and a combustion air which react and produce a flame and a flue gas in a combustion zone;
   a duct configured to remove a first portion of the flue gas from the combustion zone as a recycled flue gas, wherein the first portion of the flue gas is mixed, upstream of the combustion zone, with the fuel gas and the combustion air;
   an inlet configured to provide a cooling gas to the first portion of the flue gas; and
   a second duct configured to remove a second portion of the flue gas from the heating system,
   wherein the second portion of the flue gas has passed through a convection zone of the heating system,
   wherein the convection zone is disposed downstream from the combustion zone, and
   wherein the second portion of the flue gas is mixed, upstream of the combustion zone, with the fuel gas and the combustion air, and
   wherein the cooling gas is provided to the first portion of the flue gas upstream of the mixing of the first portion of the flue gas with the fuel gas and the combustion air.

7. The heating system of claim 6, further comprising: a sensor configured to obtain information relating to a composition of the fuel gas.

8. The heating system of claim 7, further comprising:
   a controller configured to adjust an operational condition associated with the burner based on the composition of the fuel gas.

9. A method of controlling a burner, the method comprising:
   reacting, in a combustion zone of a heating system, a fuel gas and a combustion air to produce a flame and a flue gas;
   removing a first portion of the flue gas from the combustion zone as a recycled flue gas;
   mixing the first portion of the flue gas, upstream of the combustion zone, with the fuel gas and the combustion air;
   removing a second portion of the flue gas from the heating system, wherein the second portion of the flue gas has passed through a convection zone, wherein the convection zone is downstream of the combustion zone;
   mixing the second portion of the flue gas, upstream of the combustion zone, with the fuel gas and the combustion air; and,
   mixing a cooling gas with the first portion of the flue gas, wherein the cooling gas is mixed with the first portion of the flue gas upstream of the mixing of the first portion of the flue gas with the fuel gas and the combustion air.

10. The method of claim 9, further comprising:
    determining a composition of the fuel gas.

11. The method of claim 10, further comprising:
adjusting an operational condition associated with the burner based on the composition of the fuel gas.

12. The method of claim 11, wherein the operational condition comprises a ratio of the first portion of the flue gas to the second portion of the flue gas.

13. The method of claim 9, wherein the operational conditional comprises an amount of cooling gas mixed with the first portion of the flue gas.

14. The method of claim 9, wherein the operational conditional comprises a flow rate of cooling gas.

15. The method of claim 9, further comprising:
monitoring one or more conditions, wherein the one or more conditions comprise: a temperature of a process fluid within process tubes in the combustion zone of the fuel gas; a temperature of the flame; and an amount of NOx in the flue gas.

16. The method of claim 15, further comprising:
adjusting an operational condition associated with the burner based on the one or more conditions.

17. The method of claim 16, wherein the operational condition comprises a ratio of the first portion of the flue gas to the second portion of the flue gas, or a flow rate of the cooling gas, or both.

18. The method of claim 16, further comprising:
mixing a cooling gas with the first portion of the flue gas, wherein the cooling gas is mixed with the first portion of the flue gas upstream of the mixing of the first s portion of the flue gas with the fuel gas and the combustion air.

* * * * *